United States Patent [19]

Janis

[11] Patent Number: 5,263,165
[45] Date of Patent: Nov. 16, 1993

[54] SYSTEM FOR PROVIDING USER ACCESS CONTROL WITHIN A DISTRIBUTED DATA PROCESSING SYSTEM HAVING MULTIPLE RESOURCE MANAGERS

[75] Inventor: Frederick L. Janis, Keller, Tex.

[73] Assignee: International Business Machines Corporation, Armonk, N.Y.

[21] Appl. No.: 480,442

[22] Filed: Feb. 15, 1990

[51] Int. Cl.$^5$ .............................................. G06F 12/00
[52] U.S. Cl. ................................... 395/725; 395/425; 364/DIG. 1; 364/228.8; 364/230; 364/261; 364/280.6; 364/284.4; 364/286.5
[58] Field of Search ............... 364/DIG. 1, DIG. 2; 395/200, 650, 425, 725

[56] References Cited

U.S. PATENT DOCUMENTS

| | | | |
|---|---|---|---|
| 4,924,378 | 5/1990 | Hershey et al. | 395/200 |
| 5,023,907 | 6/1991 | Johnson et al. | 380/4 |

*Primary Examiner*—Thomas C. Lee
*Assistant Examiner*—John C. Loomis
*Attorney, Agent, or Firm*—Andrew J. Dillon

[57] ABSTRACT

The method of the present invention may be utilized to provide user access control for a plurality of resource objects within a distributed data processing system having a plurality of resource managers. A reference monitor service is established and a plurality of access control profiles are stored therein. Thereafter, selected access control profile information may be communicated between the reference monitor service and a resource manager in response to an attempted access of a particular resource object controlled by that resource manager. A resource manager may utilize this communication technique to retrieve, modify, or delete a selected access control profile, as desired. Further, the resource manager may utilize this communication technique to control access to a resource object by utilizing the information contained within the access control profile to determine if the requester is authorized to access the resource object and whether or not the requester has been granted sufficient authority to take selected actions with respect to that resource object. In a preferred embodiment of the present invention, each access control profile may include access control information relating to a selected user; a selected resource object; a selected group of users; a specified level of authority associated with a selected user; a selected set of resource objects; or, a predetermined set of resource objects and a selected list of users each authorized to access at least a portion of said predetermined set of resource objects.

4 Claims, 3 Drawing Sheets

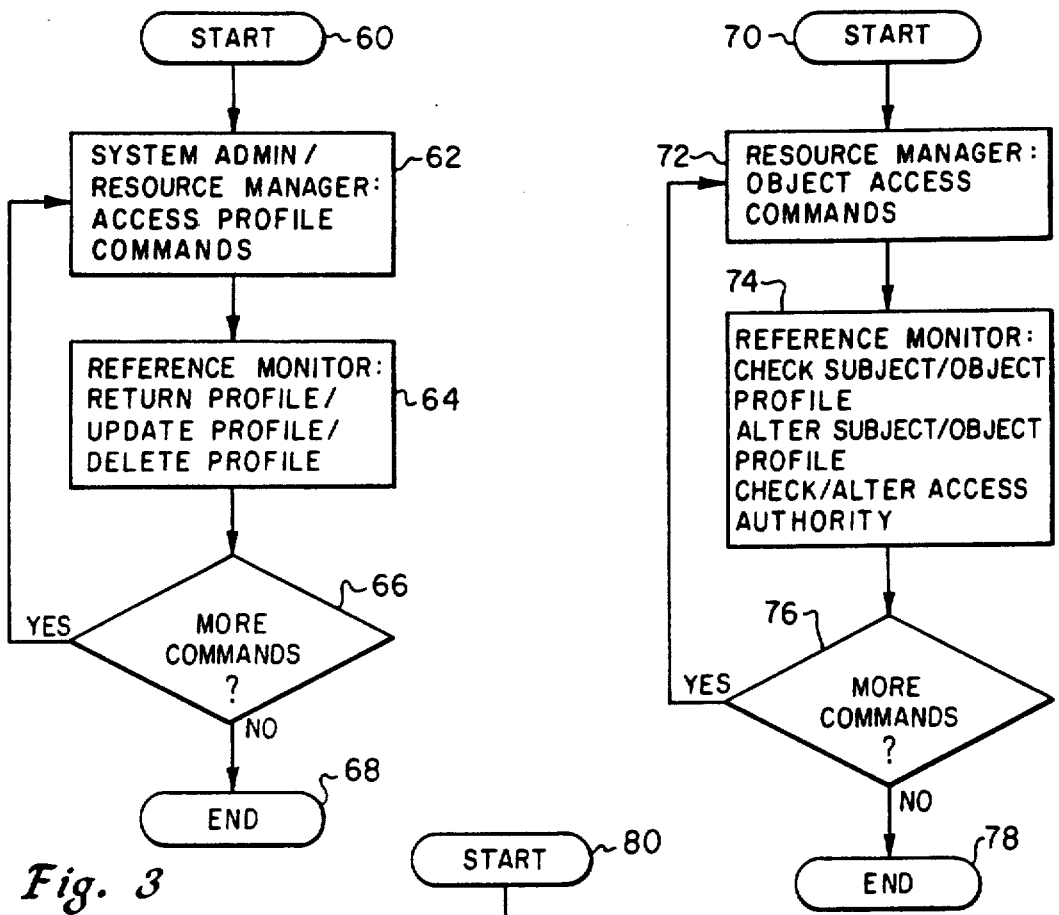
Fig. 3
Fig. 4
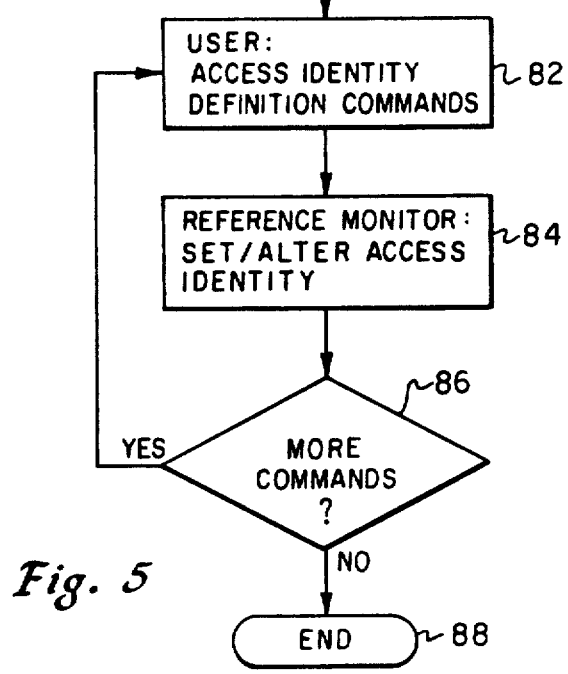
Fig. 5

SYSTEM FOR PROVIDING USER ACCESS CONTROL WITHIN A DISTRIBUTED DATA PROCESSING SYSTEM HAVING MULTIPLE RESOURCE MANAGERS

CROSS-REFERENCE TO RELATED APPLICATIONS

This application relates in general to U.S. patent application Ser. No. 07/480,440, filed of even date herewith entitled "METHOD FOR PROVIDING VARIABLE AUTHORITY LEVEL USER ACCESS CONTROL IN A DISTRIBUTED DATA PROCESSING SYSTEM," and U.S. patent application Ser. No. 07/480,437, filed of even date herewith, entitled "METHOD FOR PROVIDING USER ACCESS CONTROL WITHIN A DISTRIBUTED DATA PROCESSING SYSTEM BY THE EXCHANGE OF ACCESS CONTROL PROFILES," both by the inventor hereof and assigned to the Assignee herein.

BACKGROUND OF THE INVENTION

1. Technical Field

The present invention relates to data processing systems in general and in particular to improved methods of providing access control for a plurality of resource objects within a distributed data processing system. Still more particularly, the present invention relates to a system which permits the rapid and efficient control of access control information throughout a distributed data processing system.

2. Description of the Related Art

Security and access control systems in computer based data processing systems are well known in the prior art. Existing access control systems are generally oriented to a single host system. Such single host access control systems are generally utilized to provide security for the host and access control to applications and system resources, such as files. Each application must generally provide access control for the resources controlled by that application.

One example of an access control system designed for utilization with the IBM 370 system is a product called RACF, or Resource Assets Control Facility. RACF offers access control for applications, such as files or CICS transactions and is hierarchically oriented in access authority levels and grouping of users. RACF is a "password" oriented access control system and access is granted or denied based upon a user's individual identity and his or her knowledge of an appropriate password to verify that identity. The RACF system is, however, oriented to a single host system and cannot be employed in a distributed data processing system which employs multiple hosts associated with separate groups of resource objects, due to the fact that this system does not allow the interchange of access control information from one host to another.

Another example of known access control systems is AS/400. The AS/400 system is a capability based system in which security is based upon each individual resource object. Each user is authorized to access individual resource objects based upon the user's capability within the system. The AS/400 system maintains security by keeping User Profiles, Object Authority, and System Values within the architecture of the machine itself. As above, this system is highly efficient at controlling access to resource objects controlled by a single host; however, access to resource objects located within a distributed data processing system containing multiple hosts cannot be controlled. That is, access to a resource object controlled by one host cannot be obtained by a user enrolled at a second host.

One other example of an access control system is the DB2 product. This product permits a more flexible access control and offers granular or bundled access control authority. For example, the DB2 system may utilize special authorities for administration or database operations. Further, access privilege may be bundled into a specified authority or role so that a user may access specific resource objects based upon the user's title or authority level, rather than the user's personal identity. However, as above, the DB2 system does not possess the capability of exchanging access control information with non-DB2 applications.

Therefore, it should be obvious that a need exists for a method of providing access control in a distributed data processing system whereby access to selected resource objects may be controlled throughout the distributed data processing system by means of the communication of access control information throughout the system.

SUMMARY OF THE INVENTION

It is therefore one object of the present invention to provide an improved data processing system.

It is another object of the present invention to provide an improved method of providing access control for a plurality of resource objects within a distributed data processing system.

It is yet another object of the present invention to provide an improved method and system of providing access control for a plurality of resource objects within a distributed data processing system which permits the rapid and efficient communication of access control information throughout a distributed data processing system.

The foregoing objects are achieved as is now described. The method of the present invention may be utilized to provide user access control for a plurality of resource objects within a distributed data processing system having a plurality of resource managers. A reference monitor service is established and a plurality of access control profiles are stored therein. Thereafter, selected access control profile information may be communicated between the reference monitor service and a resource manager in response to an attempted access of a particular resource object controlled by that resource manager. A resource manager may utilize this communication technique to retrieve, modify, or delete a selected access control profile, as desired. Further, the resource manager may utilize this communication technique to control access to a resource object by utilizing the information contained within the access control profile to determine if the requester is authorized to access the resource object and whether or not the requester has been granted sufficient authority to take selected actions with respect to that resource object. In a preferred embodiment of the present invention, each access control profile may include access control information relating to a selected user; a selected resource object; a selected group of users; a specified level of authority associated with a selected user; a selected set of resource objects; or, a predetermined set of resource objects and a selected list of users each authorized to access at least a portion of said predetermined set of resource objects.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a high level flow chart depicting the communication of access control profile commands in accordance with the method of the present invention;

FIG. 4 is a high level flow chart depicting the communication of object access commands in accordance with the method of the present invention; and FIG. 5 is a high level flow chart depicting the communication of access identity definition commands in accordance with the method of the present invention.

DETAILED DESCRIPTION OF THE PREFERRED EMBODIMENT

Figure 1:
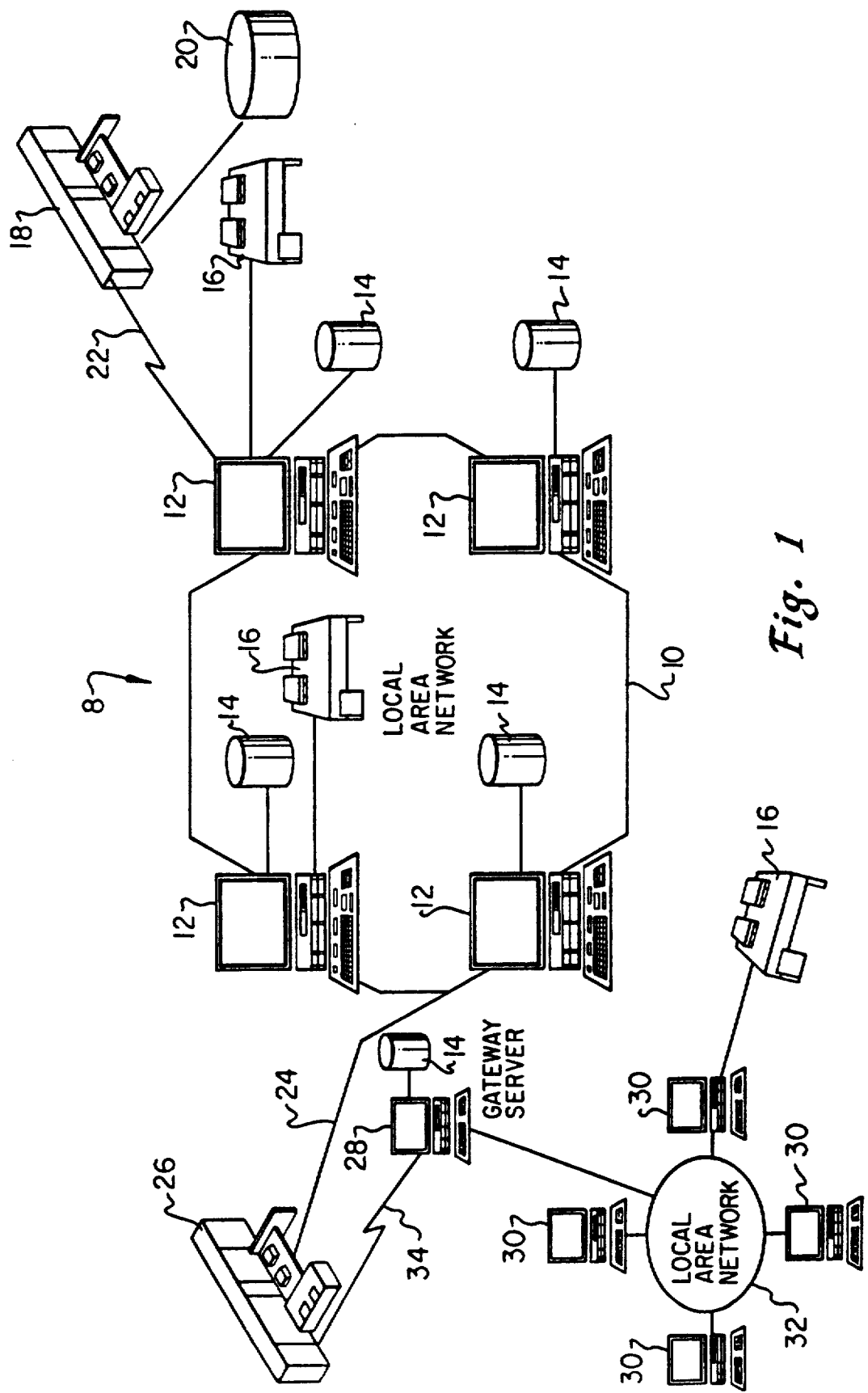
FIG. 1 depicts a pictorial representation of a distributed data processing systems which may be utilized to implement the method of the present invention.

With reference now to the figures, and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store applications or resource objects which may be periodically accessed by any user within data processing system 8. In a manner well known in the prior art, each such application or resource object stored within a storage device 14 is associated with a Resource Manager, which is responsible for maintaining and updating all resource objects associated therewith.

Still referring to FIG. 1, it may be seen that data processing network 8 may also include multiple main frame computers, such as main frame computer 18, which may be preferably coupled to Local Area Network (LAN) 10 by means of communications link 22. Main frame computer 18 may also be coupled to a storage device 20 which may serve as remote storage for Local Area Network (LAN) 10 . Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, resource objects may be stored within storage device 20 and controlled by main frame computer 18, as resource manager for the resource objects thus stored. Of course, those skilled in the art will appreciate that main frame computer 18 may be located a great geographic distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and main frame computer 18 may be located in New York.

In known prior art systems of this type, should the user of an individual computer 30 desire to access a resource object stored within storage device 20, associated with main frame computer 18, it will be necessary for the user of computer 30 to be enrolled within the security system of main frame computer 1 8. This is necessary in order for the user of computer 30 to present the proper password to obtain access to the desired resource object. Of course, those skilled in the art will appreciate that this technique will prove ungainly in distributed data processing systems, such as data processing system 8 depicted within FIG. 1

Figure 2:
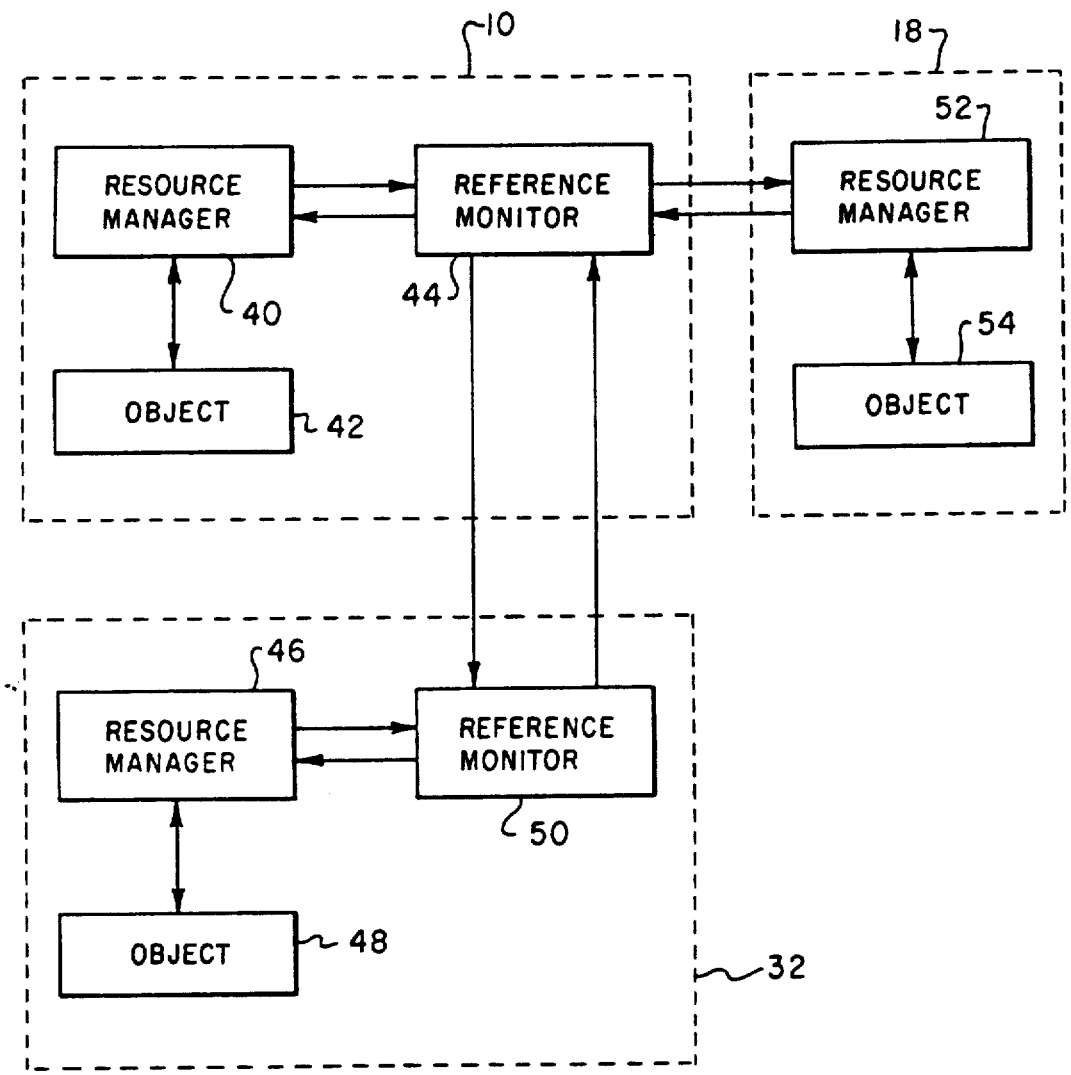
FIG. 2 depicts in block diagram form the access control system utilized with the method of the present invention.

Referring now to FIG. 2, there is depicted in block diagram form the access control system which is utilized with the method of the present invention. As is depicted, Local Area Networks (LAN) 10 and 32 are illustrated by dashed lines as is main frame computer 18. In each instance resource objects 42, 48 and 54 are illustrated in association with each portion of distributed data processing system 8 of FIG. 1. Of course, each object thus illustrated will be stored within one or more storage devices associated with each portion of data processing system 8. As is illustrated, Local Area Network 10 includes a resource manager 40 which may be one or more individual computers which are utilized to manage selected resource objects. Also established within Local Area Network 10 is a Reference Monitor 44. Reference Monitor 44, in accordance with the method of the present invention, is an application or service which is utilized to store access control profiles which may include access control information relating to: selected users; a specified level of authority associated with a selected user; selected resource objects; a selected group of users; a selected set of resource objects; or, a predetermined set of resource objects and a selected list of users, each authorized to access at least a portion of said predetermined set of resource objects.

Still referring to FIG. 2, it may be seen that within Local Area Network (LAN) 33 a resource manager 46 is illustrated, which is utilized, in a manner well known in the art, to control access to resource object 48. Similarly, a Reference Monitor 50 is established within Local Area Network (LAN) 32. Reference Monitor 50 is, as described above, preferably utilized to store access control profiles relating to individual users within Local Area Network 32 as well as resource objects stored within Local Area Network 32.

Finally, main frame computer 18 is illustrated as including a resource manager 52 which has associated therewith one or more resource objects 54.

In accordance with an important feature of the present invention, any attempted access of a resource object, such as resource object 42, 48 or 54 will automatically result in a query by the associated resource manager to one or more Reference Monitor applications to determine whether or not the access requested will be permitted. It should be noted that, in accordance with the depicted embodiment of the present invention, only one Reference Monitor application is required for data processing system 8; however, two are illustrated. In accordance with the method of the present invention, communications links between a single Reference Monitor application may be established with each and every resource manager within data processing system 8 (see FIG. 1) so that access to selected resource objects may be controlled in accordance with the access control information stored within the profiles within that Reference Monitor. The various communication commands which may be utilized will be explained in greater detail herein.

In the manner described herein, a user within Local Area Network (LAN) 32 may, via the communication links depicted within FIG. 1, request access to a resource object 54 associated with main frame computer 18. As will be explained in greater detail herein, resource manager 52 will then query Reference Monitor 44 and/or Reference Monitor 50 to determine whether or not a profile exists which permits the requested access. If so, the profile information is exchanged between the appropriate Reference Monitor and resource manager 52 and access to resource object 54 may be permitted.

With reference now to FIG. 3, there is depicted a high level flow chart illustrating the communication of access control profile commands in accordance with the method of the present invention. As is illustrated, the process begins at block 60 and thereafter passes to block 62, which depicts the system administrator or resource manager communicating an Access Profile Command to the Reference Monitor service. By "Access Profile Command" what is meant is a command which will cause an action to take place with respect to a particular access profile stored within a Reference Monitor service. Thereafter, as illustrated in block 64, the Reference Monitor service will either return a selected profile, update a selected profile or delete a selected profile, as directed by the access profile command which has been communicated by the system administrator or resource manager.

Next, block 66 illustrates a determination of whether or not additional commands need to be processed at that time and if so, the process returns to block 62 and continues thereafter in an iterative fashion. In the event no additional commands need to be processed, the process terminates, as illustrated in block 68. In this manner, the system administrator or resource manager may utilize the commands thus specified to control the communication of access control profile information between a Reference Monitor service and the system administrator or resource manager. Additionally, access control profiles may be altered or deleted as necessary, to accommodate any changes in the users who are enrolled in the various portions of distributed data processing system 8 (see FIG. 1).

Referring now to FIG. 4, there is illustrated a high level flow chart depicting the communication of certain object access commands in accordance with the method of the present invention. As in FIG. 3, the process of FIG. 4 begins at block 70 and thereafter passes to block 72 which depicts the transmittal by a resource manager of an Object Access Command to an appropriate Reference Monitor service. As utilized herein, "Object Access Commands" shall include those commands utilized in conjunction with the access of a particular resource object by a selected user within the distributed data processing network. For example, a GRANT command may be utilized to grant access to a particular resource object for a selected user within the distributed data processing network. Of course, the granting of access to a particular resource object may be accomplished at multiple variable authorization levels. Similarly, a REVOKE command may be utilized to cause the removal of the access authority with regard to a particular resource object by a selected user.

In accordance with the method of the present invention, a CHECK command may also be utilized to permit a resource manager to determine whether or not a particular user within the distributed data processing network is authorized to access a selected resource object. As disclosed within one of cross-referenced applications, the intent of the user with regard to a particular resource object may be logged at the time a CHECK command is utilized to determine thereafter whether or not the user possesses a sufficient authorization level to perform the activity intended. Finally, a QUERY command may be utilized to determine the variable authority level of a selected user with regard to a particular resource object. In this manner, a resource manager may simply and easily determine whether or not a user within the distributed data processing network possesses sufficient authority level to perform the activity which has been entered in response to a question regarding the user's access intent.

Next, the Reference Monitor service will respond to the Object Access Commands communicated thereto by the resource manager, as illustrated in block 74. Block 74 depicts the checking of a subject/object profile, the altering of a subject/object profile or the checking or alteration of the access authority level for a particular resource object or user. Thereafter, block 76 is utilized to illustrate a determination of whether or not additional Object Access Commands must be processed and if so, the process returns to block 72 and continues thereafter in an iterative fashion. In the event no additional commands require processing, the process passes to block 78 and terminates.

Finally, with reference to FIG. 5, there is depicted a high level flow chart depicting the communication of Access Identity Definition Commands in accordance with the method of the present invention. As above, the process begins at block 80 and thereafter passes to block 82 wherein an individual user enters an Access Identity Definition Command. An "Access Identity Definition Command," in accordance with the method of the present invention, may be utilized to create or alter the access control identity of a particular user, based upon the combination of the access authority permitted by the individual user's profile and the access authority which is authorized to the user as a result of his or her membership in a set of group profiles which may be specified utilizing such commands. Those skilled in the art will appreciate that the method of the present invention provides an improvement over known user access control systems in that a user may access a particular resource object based upon the user's individual profile or, alternatively, based upon the user's membership in a particular group which is represented in a group profile stored within a Reference Monitor service.

Thereafter, block 84 illustrates the response of the Reference Monitor service to an Access Identity Definition Command by setting or altering the access identity of the particular user communicating with the Reference Monitor service at that time. Thereafter, block 86 illustrates a determination of whether or not additional Access Identity Definition Commands must be processed and if so, as above, the process returns to block 82 and continues thereafter in an iterative fashion. In the event no additional Access Identity Definition Commands must be processed, then the process terminates, as illustrated in block 88.

Upon reference to the foregoing, those skilled in the art will appreciate that the Applicant in the present case has developed an access control system in which access profile information is contained within a Reference Monitor service such that this information may be retrieved, altered, initiated, or verified by means of a series of communication commands which may be transmitted between a resource manager and one or more Reference Monitor services. In this manner, user access control throughout a distributed data processing system may be simply and efficiently controlled to permit efficient access of resource objects without requiring a system wide enrollment procedure.

While the invention has been particularly shown and described with reference to a preferred embodiment, it will be understood by those skilled in the art that various changes in form and detail may be made therein without departing from the spirit and scope of the invention.

What is claimed is:

1. A computer implemented method of providing variable authority level user access control for a plurality of resource objects within a distributed data processing system having at least one reference monitor service and a plurality of resource managers associated with said plurality of resource objects, each of said plurality of resource managers controlling access to different selected ones of said resource objects, each of said resource managers associated with a reference monitor service, said method comprising the computer implemented steps of:

storing a plurality of unique access control profiles within each said reference monitor service, wherein selected ones of said plurality of access control profiles each include an identification of a selected user and a specified level of authority associated with said selected user;

querying an associated reference monitor service by a selected one of said resource managers in order to vary access control for a particular resource object by a selected user, wherein access to said particular resource object is controlled by said selected resource manager;

transmitting a selected access control profile associated with said selected user from said associated reference monitor service to said selected one of said resource managers if said selected access control profile existed in said associated reference monitor service; if not, attempting to retrieve said selected access control profile from another said reference monitor service and thereafter transmitting said retrieved access control profile to said selected one of said resource managers;

utilizing said selected resource manager to selectively modify said access control information in said selected access control profile; and storing said selectively modified access control information in said selected access control profile within an associated reference monitor service wherein subsequent access to said particular resource object may be variably controlled.

2. The computer implemented method of providing variable authority level user access control for a plurality of resource objects stored within a distributed data processing system according to claim 1, wherein selected ones of said plurality of access control profiles include an identification of a selected group of users and a specified level of authority associated with each user within said selected group of users.

3. A data processing system for providing variable authority level user access control for a plurality of resource objects within a distributed data processing system having at least one reference monitor service and a plurality of resource managers associated with said plurality of resource objects, each of said plurality of resource managers controlling access to different selected ones of said resource objects, each of said resource managers associated with a reference monitor service, said data processing system comprising:

means for storing a plurality of unique access control profiles within each said reference monitor service, wherein selected ones of said plurality of access control profiles each include an identification of a selected user and a specified level of authority associated with said selected user;

means for querying an associated reference monitor service by a selected one of said resource managers in order to vary access control for a particular resource object by a selected user, wherein access to said particular resource object is controlled by said selected resource manager;

means for transmitting a selected access control profile associated with said selected user from said associated reference monitor service to said selected one of said resource managers if said selected access control profile existed in said associated reference monitor service; and if not, for attempting to retrieve said selected access control profile from another said reference monitor service and thereafter transmitting said retrieved access control profile to said selected one of said resource managers;

means for utilizing said selected resource manager to selectively modify said access control information in said selected access control profile; and means for storing said selectively modified access control information in said selected control profile within an associated reference monitor service wherein subsequent access to said particular resource object may be variably controlled.

4. The data processing system for providing variable authority level user access control for a plurality of resource objects stored within a distributed data processing system according to claim 3, wherein selected ones of said plurality of access control profiles include an identification of a selected group of users and a specified level of authority associated with each user within said selected group of users.

* * * * *